United States Patent
Lundell et al.

(10) Patent No.: US 8,335,509 B2
(45) Date of Patent: Dec. 18, 2012

(54) CELL RE-SELECTION UTILIZING SYSTEM INFORMATION LENGTH

(75) Inventors: Antero Lundell, Turku (FI); Lars Dalsgaard, Oulu (FI)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/506,292

(22) Filed: Jul. 21, 2009

(65) Prior Publication Data

US 2010/0009672 A1    Jan. 14, 2010

Related U.S. Application Data

(62) Division of application No. 11/110,444, filed on Apr. 20, 2005, now Pat. No. 7,587,204, which is a division of application No. 09/419,171, filed on Oct. 15, 1999, now Pat. No. 7,058,406.

(30) Foreign Application Priority Data

Oct. 16, 1998    (FI) .......................................... 982251

(51) Int. Cl.
H04W 36/00 (2009.01)
H04W 72/00 (2009.01)
H04M 1/00 (2006.01)

(52) U.S. Cl. ..................... 455/436; 455/453; 455/452.1; 455/443; 455/552.1

(58) Field of Classification Search .................. 455/444, 455/439, 443, 134, 436, 552.1
See application file for complete search history.

(56) References Cited

U.S. PATENT DOCUMENTS

| | | | |
|---|---|---|---|
| 5,241,685 A | 8/1993 | Bodin et al. | |
| 5,430,740 A | 7/1995 | Kivari et al. | |
| 5,722,072 A | 2/1998 | Crichton et al. | |
| 5,768,267 A * | 6/1998 | Raith et al. ..................... | 370/329 |
| 5,797,096 A | 8/1998 | Lupien et al. | |
| 5,930,241 A | 7/1999 | Fried | |
| 6,091,955 A | 7/2000 | Aalto et al. | |
| 6,308,066 B1 | 10/2001 | Ranta et al. | |
| 6,311,059 B1 | 10/2001 | Walton | |
| 6,377,803 B1 | 4/2002 | Ruohonen | |
| 6,477,377 B2 * | 11/2002 | Backstrom et al. ........... | 455/446 |
| 6,510,146 B1 * | 1/2003 | Korpela et al. ................ | 370/332 |
| 6,546,251 B1 * | 4/2003 | Dalsgaard et al. ............ | 455/437 |
| 6,735,442 B2 | 5/2004 | Tu et al. | |
| 6,765,891 B2 | 7/2004 | Laitinen et al. | |
| 6,792,284 B1 * | 9/2004 | Dalsgaard et al. ............ | 455/525 |

FOREIGN PATENT DOCUMENTS

| | | |
|---|---|---|
| EP | 0928119 A2 | 7/1999 |
| JP | 9271062 | 10/1997 |
| JP | 10215475 | 8/1998 |
| WO | 98/17021 | 4/1998 |
| WO | 99/01005 | 1/1999 |

* cited by examiner

Primary Examiner — Tilahun B Gesesse
(74) Attorney, Agent, or Firm — Eugene I Shkurko

(57) ABSTRACT

A method for performing cell re-selection in a cellular network includes a subscriber terminal measuring received powers of neighbour cells in accordance with system information received from a current cell, selecting one of the neighbour cells as a new cell, the subscriber terminal receiving a part of the system information sent by the new cell, calculating the time used for receiving the system information of the new cell by employing the length information in the system information part sent by the new cell, and deciding whether to continue the re-selection of said new cell on the basis of the calculated time.

5 Claims, 11 Drawing Sheets

FIG. 5A

TDMA-MULTIFRAME #0 → ... → TDMA-MULTIFRAME #50

| TC | B0 | B1 | XX | B2 | B3 | XX | B4 | B5 | XX | B6 | B7 | XX | B8 | B9 | X |
|---|---|---|---|---|---|---|---|---|---|---|---|---|---|---|---|
| M=4, BS=1 | | | | | | | | | | | | | | | |
| 0 | PSI1 | | | | | | | | | | | | | | |
| 1 | PSI2(0) | | | | | | | | | | | | | | |
| 2 | PSI2(1) | | | | | | | | | | | | | | |
| 3 | PSI2(3) | | | | | | | | | | | | | | |
| 0 | PSI1 | | | | | | | | | | | | | | |
| 1 | PSI3 | | | | | | | | | | | | | | |
| 2 | PSI4 | | | | | | | | | | | | | | |
| M=5, BS=4 | | | | | | | | | | | | | | | |
| 0 | | | | PSI2(0) | | | | PSI2(1) | | | | | | | |
| 1 | PSI1 | | | PSI2(3) | | | | PSI2(4) | | | PSI2(5) | | | | |
| 2 | PSI2(2) | | | PSI3B(0) | | | | PSI3B(1) | | | PSI3B(2) | | | | |
| 3 | PSI2(6) | | | PSI3B(4) | | | | PSI3B(5) | | | PSI3B(6) | | | | |
| 4 | PSI3B(3) | | | PSI4(1) | | | | PSI4(0) | | | PSI4(2) | | | | |
| 0 | PSI3B(7) | | | PSI4(0) | | | | PSI4(3) | | | PSI1 | | | | |
|   | PSI1 | | | | | | | | | | | | | | |

FIG. 5B

CELL RE-SELECTION UTILIZING SYSTEM INFORMATION LENGTH

CROSS REFERENCE TO RELATED APPLICATIONS

This application is a divisional of U.S. application Ser. No. 11/110,444, filed 20 Apr. 2005 now U.S. Pat. No. 7,587,204 which is a divisional of U.S. application Ser. No. 09/419,171, filed 15 Oct. 1999, now U.S. Pat. No. 7,058,406, issued 6 Jun. 2006, which claims priority of Finland Patent No. 105312 issued 14 Jul. 2000.

FIELD OF THE INVENTION

The invention relates to implementing cell re-selection in a cellular network. The invention particularly relates to a cellular network using GPRS (General Packet Radio Service), and to a PBCCH (Packet Broadcast Control Channel) used therein, and to mapping system information onto the PBCCH.

BACKGROUND OF THE INVENTION

When a subscriber terminal moves, measures must be taken which make sure that the subscriber terminal always listens to the base station that is best heard. The subscriber terminal receives system information sent by the base station on a control channel informing which neighbour base stations the subscriber terminal should also listen to. When the subscriber terminal detects that the received power of a neighbour cell signal it has listened to and possibly some other parameters are better than that of the cell, whose control channel the subscriber terminal has been listening to, then the subscriber terminal decides to perform cell re-selection. A network part of a cellular network, i.e. the network infrastructure including, for example, base stations, base station controllers and mobile services switching centers, can also discover the need for cell re-selection and inform the subscriber terminal about it. In connection with cell re-selection the subscriber terminal has to receive the system information of a new cell sent on its control channel.

In an ordinary GSM system the system information has a standard, structure. In a cellular network using GPRS the structure and length of the system information sent by different cells may vary a lot. The subscriber terminal does not know in advance how long it takes to read the system information. In demanding packet transmission applications this may result in a situation, where a fairly long break may occur in performing packet transmission so that the user detects the break as a delay in the application operation. The user may interpret the delay as poor quality service.

BRIEF DESCRIPTION OF THE INVENTION

It is thus an object of the invention to provide a method and an apparatus implementing the method so as to solve the above problems. This is achieved with the method presented below. The method performs cell re-selection in a cellular network comprising a subscriber terminal measuring received powers of neighbour cells in accordance with system information received from a current cell; one of the neighbour cells as a new cell; the subscriber terminal receiving a part of the system information sent by the new cell. In this method the time used for receiving the system information of the new cell is calculated by employing the length information in the system information part sent by the new cell.

The invention also relates to a subscriber terminal comprising a radio connection to a current cell base station of a cellular network; means for measuring received powers of neighbour cells in accordance with system information received from a current cell; means for discovering the need for re-selection; means for receiving system information sent by a new cell. In addition, the subscriber terminal comprises means for calculating the time it takes to receive .the system information of the new cell using the length information in a system information part sent by the new cell.

The invention also relates to a network part of a cellular network comprising means for sending system information of a-cell. In addition the network part comprises means for placing length information indicating the system information length into a system information part.

The preferred embodiments of the invention are disclosed in the dependent claims.

The idea of the invention is that system information contains the system information length. On the basis of the length information the subscriber terminal can calculate how long it takes to receive the system information.

Several advantages are achieved with the method and system of the invention. The system information length information included in the system information enables an open way to map system information elements onto a logical control channel. The network operator can map only the necessary information elements onto the logical control channel, without limiting the total number of elements.

The subscriber terminal can estimate on the basis of the received system information length how long it takes to re-select a cell to said cell. Likewise the network part naturally knows how long it takes to re-select a cell to each cell.

Estimation of the cell re-selection time enables the functions of the network part and the subscriber terminal to be controlled before, during and after cell re-selection. For example, if the estimated time is exceeded by a certain percentage cell re-selection can be interrupted and re-started from the beginning, possibly with another cell. The user or the application employed by the user can also be provided with information about a starting cell re-selection, during which a break will occur in data transmission. The invention can also be utilized in battery or memory saving routines.

BRIEF DESCRIPTION OF THE DRAWINGS

In the following the invention will be described in greater detail in connection with the preferred embodiments and with reference to the accompanying drawings, in which
FIGS. 5A and 5B show examples of mapping system information into radio packets.

DETAILED DESCRIPTION OF THE INVENTION

Figure 1A:
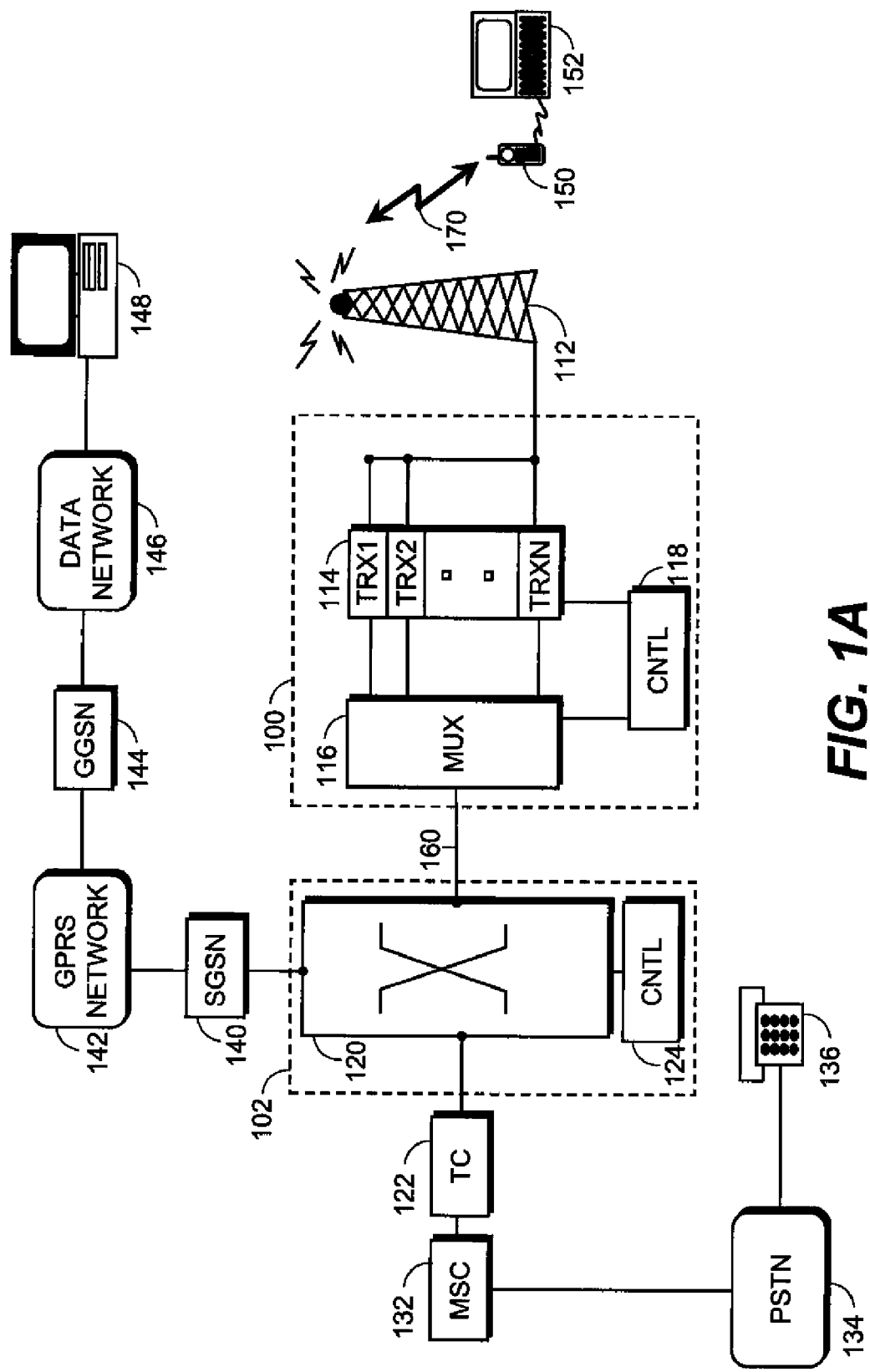
FIG. 1A is a block diagram showing a cellular network,
FIG. 1 B shows a circuit-switched connection,
FIG. 1 C shows a packet-switched connection.
Figure 1B:
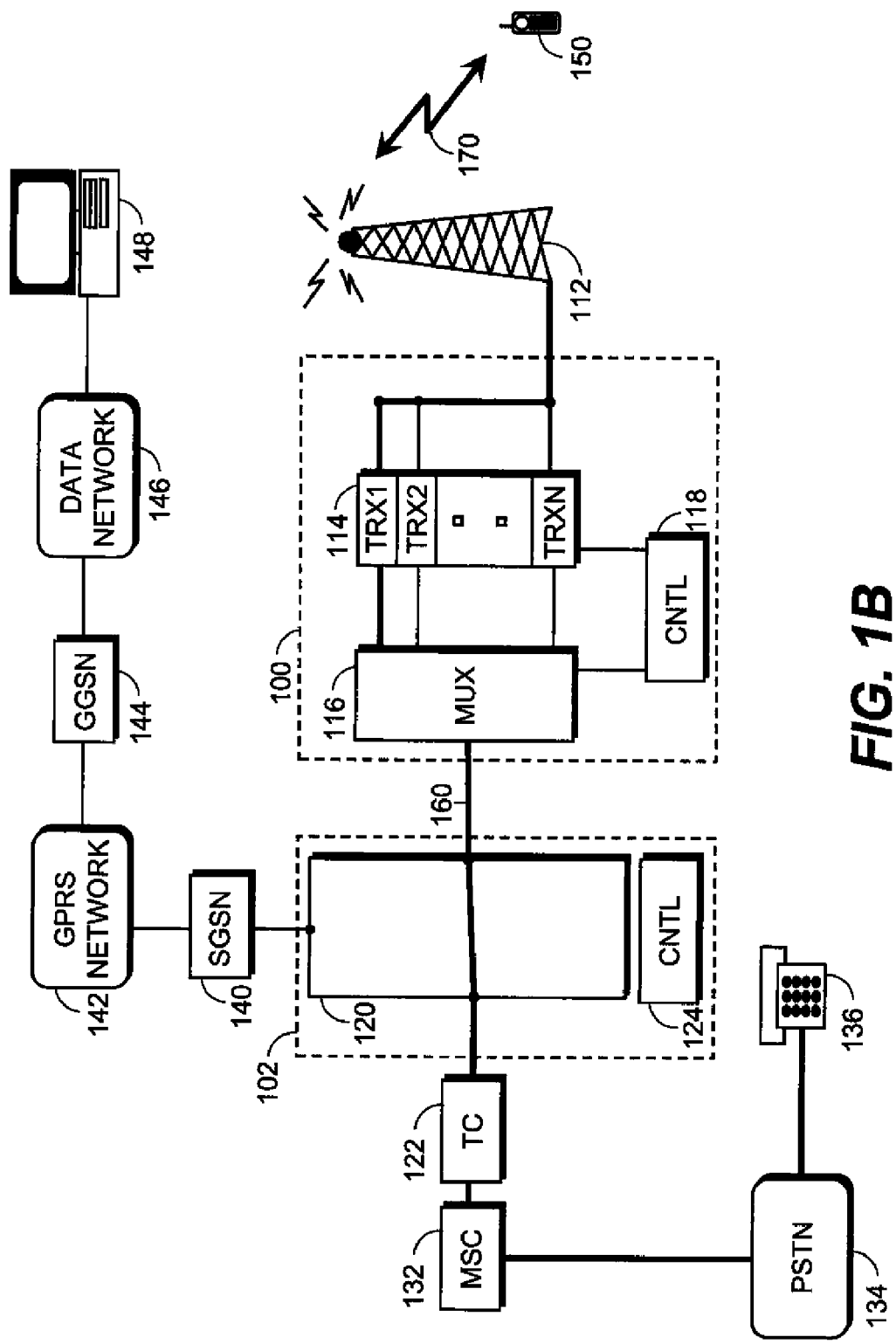
Figure 1C:
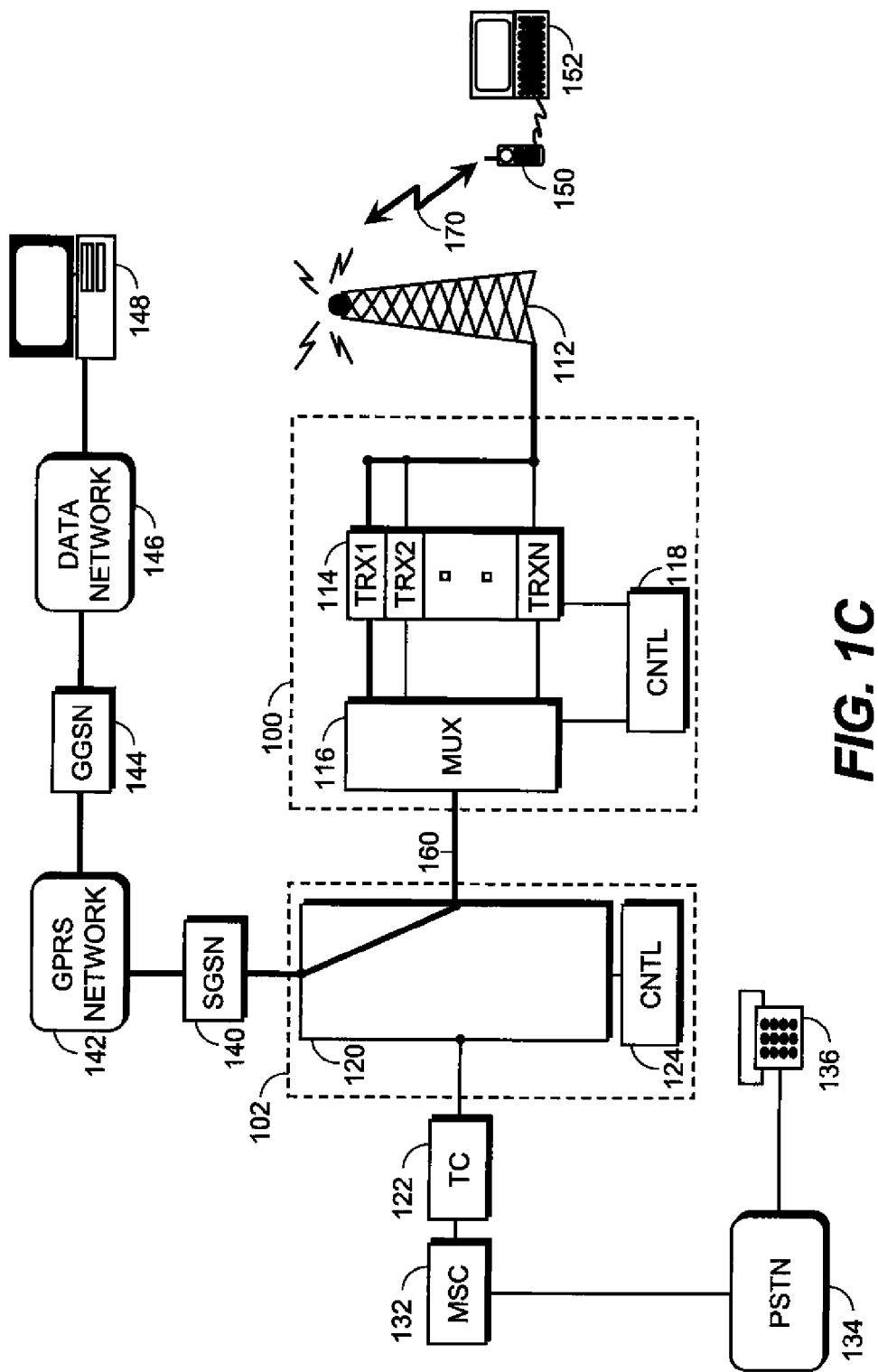

With reference to FIG. 1 a typical cellular network structure of the invention and its interfaces to a fixed telephone network and a packet transmission network are described. FIG. 1 comprises only the blocks that are essential for describing the invention, but for those skilled in the art it is obvious that a conventional cellular network also includes other functions and structures that will not be described here in greater detail. The invention is most preferably used in a GSM phase 2+ packet transmission, i.e. in GPRS (General Packet Radio Service). GPRS (General Packet Radio Service) is a new GSM-based service, where air interface capacity not used in circuit-switching is employed for packet transmission.

A cellular network typically comprises a fixed network infrastructure, or a network part, and subscriber terminals 150, which may be fixedly mounted, vehicle mounted or hand-held portable terminals. The network part comprises base stations 100. Several base stations 100 are, in turn, controlled in a centralized manner by a base station controller 102 communicating with them. The base station 100 comprises transceivers 114, typically 1-16 transceivers 114. One transceiver 114 offers radio capacity to one TDMA frame, i.e. typically to eight time slots.

The base station 100 comprises a control unit 118 controlling the operation of the transceivers 114 and a multiplexer 116. The multiplexer 116 arranges traffic and control channels used by multiple transceivers 114 to a single data link 160.

There is a connection from the transceivers 114 of the base station 100 to an antenna unit 112 implementing a bi-directional radio connection 170 to a subscriber terminal 150. The structure of the frames to be transmitted on the bi-directional radio connection 170 is also accurately determined and referred to as an air interface.

The subscriber terminal 150 can be, for example, a standard GSM mobile phone to which a laptop computer 152, which may be used in packet transmission for ordering and processing packets, can for instance be connected by an additional card.

Figure 2:
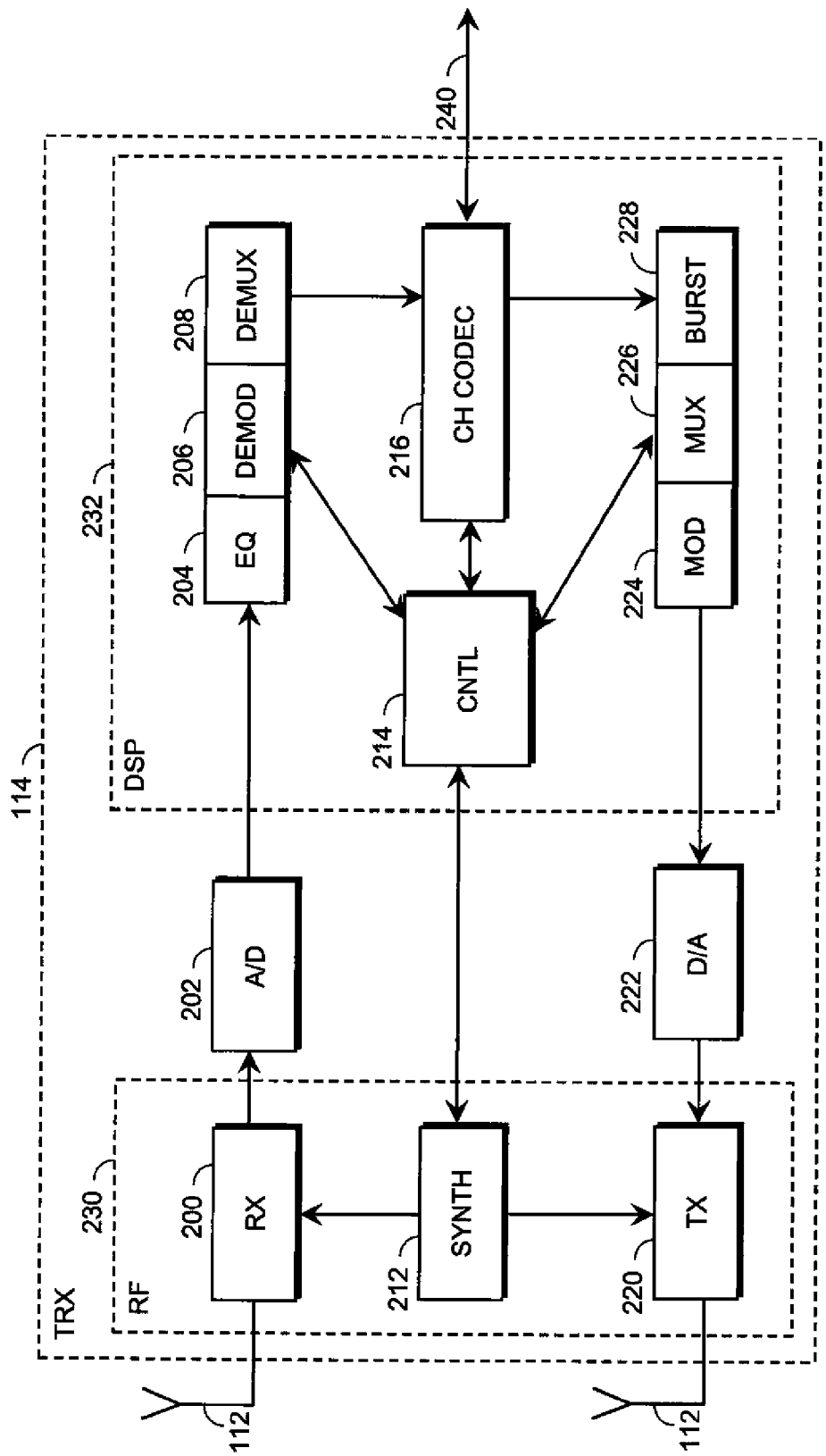
FIG. 2 shows the structure of a transceiver.

FIG. 2 illustrates in greater detail the structure of a transceiver 114. A receiver 200 comprises a filter blocking frequencies outside a desired frequency band. A signal is then converted to an intermediate frequency or directly to baseband, in which form the signal is sampled and quantized in an analogue-to-digital converter 202. An equalizer 204 compensates for interference caused by multipath propagation, for example. From the equalized signal a demodulator 206 takes a bit stream that is transmitted to a demultiplexer 208. The demultiplexer 208 separates the bit stream from different time slots into its logical channels. A channel codec 216 decodes the bit stream of the different logical channels; i.e. decides whether the bit stream is signalling data transmitted to a control unit 214, or speech transmitted 240 to a speech codec 122 of the base station controller 102. The channel codec 216 also performs error correction. The control unit 214 performs internal control functions by controlling various units. A burst former 228 adds a training sequence and a tail to the data arriving from the channel codec 216. A multiplexer 226 assigns to each burst its time slot. A modulator 224 modulates digital signals to a radio frequency carrier. This function is of analogue nature and therefore a digital-to-analogue converter 222 is needed to perform it. A transmitter 220 comprises a filter limiting the bandwidth. In addition, the transmitter 220 controls the output power of the transmission. A synthesizer 212 arranges the necessary frequencies for different units. The synthesizer 212 includes a clock that may be controlled locally or in a centralized manner from somewhere else, for example, from the base station controller 102. The synthesizer 212 creates the necessary frequencies, for example, by a voltage-controlled oscillator.

FIG. 2 shows how the transceiver structure can be further divided into radio frequency parts 230 and a digital signal processing processor including software 232. The radio frequency parts 230 comprise the receiver 200, the transmitter 220 and the synthesizer 212. The digital signal, processing processor including software 232 comprises the equalizer 204, the demodulator 206, the demultiplexer 208, the channel codec 216, the control unit 214, the burst former 228, the multiplexer 226 and the modulator 224. The analogue-to-digital converter 202 is needed to convert the analogue radio signal into a digital signal, and correspondingly the digital-to-analogue converter 222 is needed to convert the digital signal into an analogue signal.

The base station controller 102 comprises a group switching field 120 and 'a control unit 124. The group switching field 120 is used for switching speech and data and for connecting signalling circuits. The base station 100 and the base station controller 102 form a base station system that comprises a transcoder 122. The transcoder 122 is generally located as close as possible to a mobile services-switching centre 132, since speech can then be transferred in cellular network form between the transcoder 122 and the base station controller 102, thus saving transmission capacity.

The transcoder 122 converts different digital speech coding forms used between a public switched telephone network and a cellular network to suit one another, for example, from the 64 kbit/s fixed network form to another cellular network form (e.g. 13 kbit/s) and vice versa. The control unit 124 performs call control, mobility management, statistical data collection and signalling.

The structure of the subscriber terminal 150 can be described utilizing the description of the transceiver 114 structure in FIG. 2. The structural parts of the subscriber terminal 150 are functionally the same as the ones in the transceiver 114. In addition, the subscriber terminal 150 comprises a duplex filter between the antenna 112 and the receiver 200 and the transmitter 220, user interface parts and a speech codec. The speech codec is connected to the channel codec 216 through a bus 240.

As FIG. 1A shows the group switching field 120 can perform switching (depicted by black spots) to a public switched telephone network (PSTN) 134 through the mobile services switching centre 132 and to a packet transmission network 142. A typical terminal 136 in the public switched telephone network 134 is an ordinary or an ISDN (Integrated Services Digital Network) phone.

The connection between the packet transmission network 142 and the group switching field 120 is established by a support node (SGSN=Serving GPRS Support Node) 140. The aim of the support node 140 is to transfer packets between the base station system and a gateway node (GGSN=Gateway GPRS Support Node) 144, and to keep record of the location of the subscriber terminal 150 within its area.

The gateway node 144 connects the packet transmission network 142 and a public packet transmission network 146. An Internet protocol or an X.25 protocol can be used at the interface. By encapsulating the gateway node 144 hides the internal structure of the packet transmission network 142 from the public packet transmission network 146, so for the public packet transmission network 146 the packet transmission network 142 resembles a sub-network, the public packet transmission network being able to address packets to the subscriber terminal 150 placed therein and to receive packets therefrom.

The packet transmission network 142 is typically a private network using an Internet protocol carrying signalling and tunneled user data. The structure of the network 142 may vary operator-specifically regarding the architecture and protocols below the Internet protocol layer.

The public packet transmission network 146 may be, for example, a global Internet, to which a terminal 148, for example a server computer, with a connection thereto wants to, transfer packets to the subscriber terminal 150.

At the air interface 170 time slots not allocated to circuit-switched transmission are typically used for packet transmission. Capacity is dynamically allocated for packet transmission, so when a data transmission request arrives any free channel can be allocated to be used in packet transmission. The arrangement is flexible, circuit-switched connections taking priority over packet data links. When necessary, circuit-switched transmission cancels out packet-switched transmission, i.e. a time slot engaged in packet transmission is passed on to circuit-switched transmission. This is possible, since packet transmission endures such interruptions well; the transmission is proceeded in another time slot allocated for use. The arrangement can also be implemented in such a manner that no definite priority is given to circuit-switched transmission, but both circuit-switched and packet-switched transmission requests are served in their order of arrival.

FIG. 1 B describes how a circuit-switched data link is established between the subscriber terminal 150 and the terminal 136 of the public switched telephone network. A bold line shows how data is carried through the system at the air interface 170, from the antenna 112 to the transceiver 114, and from there multiplexed in the multiplexer 116 along the data link 160 to the group switching field 120, where a connection is established to the output heading to the transcoder 122, and from there onwards through the connection performed in the mobile services switching centre 132 to the terminal 136 connected to the public switched telephone network 134. In the base station 100, the control unit 118 controls the multiplexer 116 in the transmission, and in the base station controller 102 the control unit 124 controls the group switching field 120 to perform the correct connection.

FIG. 1 C shows a packet-switched data link. A laptop computer 152 is now connected to the subscriber terminal 150. A bold line describes how data to be transferred is carried from a server computer 148 to the laptop computer 152. Data can naturally also be transferred in the opposite direction, from the laptop computer 152 to the server computer 148. Data is carried through the system at the air interface 170, from the antenna 112 to the transceiver 114 and from there multiplexed in-the multiplexer 116 along the data link 160 that is free of circuit-switched data transmission to the group switching field 120, where a connection is established to the output heading to the support node 140. From the support node 140 data is applied along the packet transmission network 142 through the gateway node 144 and is connected to the server computer 148 connected to the public packet transmission network 146.

In FIG. 1 B one time slot is used for circuit-switched transmission, but in FIG. 1 C the free capacity of the circuit-switched data link 160 corresponding to all available time slots of the air interface 170 can be used. For the sake of clarity, a case where both circuit-switched and packet-switched data are simultaneously transferred is not described in FIGS. 1A and 1B. However, this is possible and very common, since the capacity free from circuit-switched data transmission can flexibly be used to implement packet-switched transmission or packet-switched signalling. Such a network can also be constructed, where circuit-switched data is not transferred at all, only packet data. Then the structure of the network can be simplified.

Figure 3:
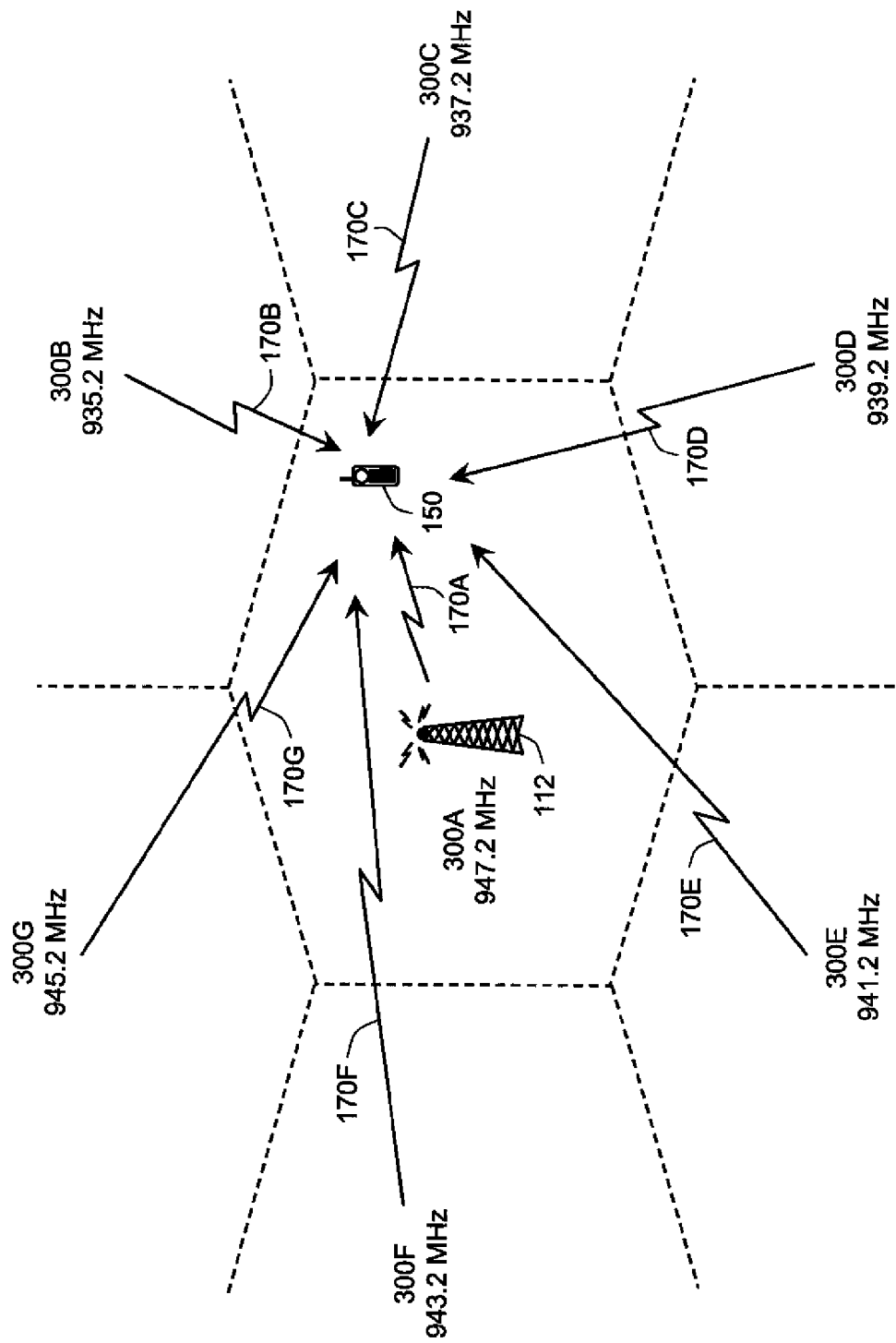
FIG. 3 illustrates the principle of cell re-selection,
FIGS. 4A and. 4B form a flow chart illustrating a cell re-selection method of the invention.

FIG. 3 illustrates the principle of cell re-selection. The GSM cellular network spectrum is located between 890-960 MHz. The uplink direction employs the frequency range 890-915 MHz and the downlink direction the frequency range 935-960 MHz. In practice, it should be noted that a particular operator is able to use only a certain part of the total spectrum. The carrier spacing is 200 kHz. The duplex spacing of the uplink and downlink directions is 45 MHz. In a current cell 300A the subscriber terminal 150 listens to control channels at the frequency 947.2 MHz. The neighbour base stations 300B, 300C, 300 D, 300E, 300F, 3000 are indicated on the control channel, for example, in the GPRS on the PBCCH (Packet Broadcast Control Channel), as well as the frequencies of the downlink control channels of the neighbour base stations 935.2 MHz, 937.2 MHz, 939.2 MHz, 941.2 MHz, 943.2 MHz, 945.2 MHz, on which the subscriber terminal 150 has to measure the received power of the signal and possibly some other parameters.

On the radio connection 170A the subscriber terminal 150 listens to control channels of the current cell 300A. In addition, it regularly measures on unidirectional radio connections 170B, 170C, 170D, 170E, 170F, 170G the received powers of the neighbour cells 300B-300G.

In the GPRS—the network part can order the subscriber terminal to perform MM (Mobility Management) measurements in ready state or in packet idle mode. In addition to the listening radio connections 170A-170G described in FIG. 3, the subscriber terminal 150 may also have a bidirectional radio connection in progress with the current cell 300A. The subscriber terminal 150 is referred to as being in connected mode or in non-connected mode, depending on whether it has a bidirectional radio connection in progress or not. On the basis of the measurements the subscriber terminal 150 can make a decision about cell re-selection, or the network part can make the decision. Cell re-selection refers to a similar process as handover in a standard GSM system.

In the example in FIG. 3, when the subscriber terminal 150 moves from the current cell 300A to a new cell 300C, the received power of the control channels of the new cell 300C exceeds the received power of the control channels of the current cell 300A. The subscriber terminal 150 should in general communicate with the cell offering the best service. Cell re-selection is then performed, i.e. a new cell 300C becomes the current cell. In cell re-selection the subscriber terminal 150 has to listen to the system information of the new cell 300C from the control channels of the new cell 300C; the system information being referred to as packet system information in the GPRS.

If the subscriber terminal has no active connection, i.e. packet transmission is not in progress, it does not have to signal any information to the network part in connection with cell re-selection, if the routing area thereof remains unchanged. If the routing area changes, then the subscriber terminal has to signal a new cell to the network part. When the connection is active the subscriber terminal has to signal a cell update to the network part.

As noted above the structure and length of the system information sent by various cells in a cellular network using GPRS may vary considerably. Then, the subscriber terminal 150 does not know in advance how long it takes to read the system information. In demanding packet transmission applications this may result in a situation where a fairly long break may occur in packet transmission. The user may interpret the delay as poor quality of service.

The length of the system information sent on the PBCCH in the GPRS may vary from 3 to over 70 different system information elements. This causes uncertainty to the time it takes to re-select a cell, since it is not known in advance how much system information the subscriber terminal has to receive from the new cell 300C. The system information elements are:

PSI1
PSI2(0-7)
PSI3
PSI3bis(0-15)
PSI4(0-7)
PSI5(0-7)

There are six different elements. The numbers 0-7, 0-15 in brackets indicate the possible number of different instances of said elements.

Another factor affecting cell re-selection is how frequently an element is mapped onto the PBCCH. If this frequency is low, the cell re-selection time increases.

A third affecting factor is the system information mapping scheme used. By selecting a fast mapping scheme the re-selection time decreases. There are some factors that affect the mapping speed:

The same system information element should not be mapped several times during a system information mapping period. One mapping period refers to the time during which one occurrence of each system information element has been received.

The time between each system information element transmission should be kept at a minimum.

The network operator may use different measures to adjust the factors affecting the cell re-selection time, and thus control the re-selection time. These different factors can be selected so as to optimize the use of the cellular network.

Figure 4A:
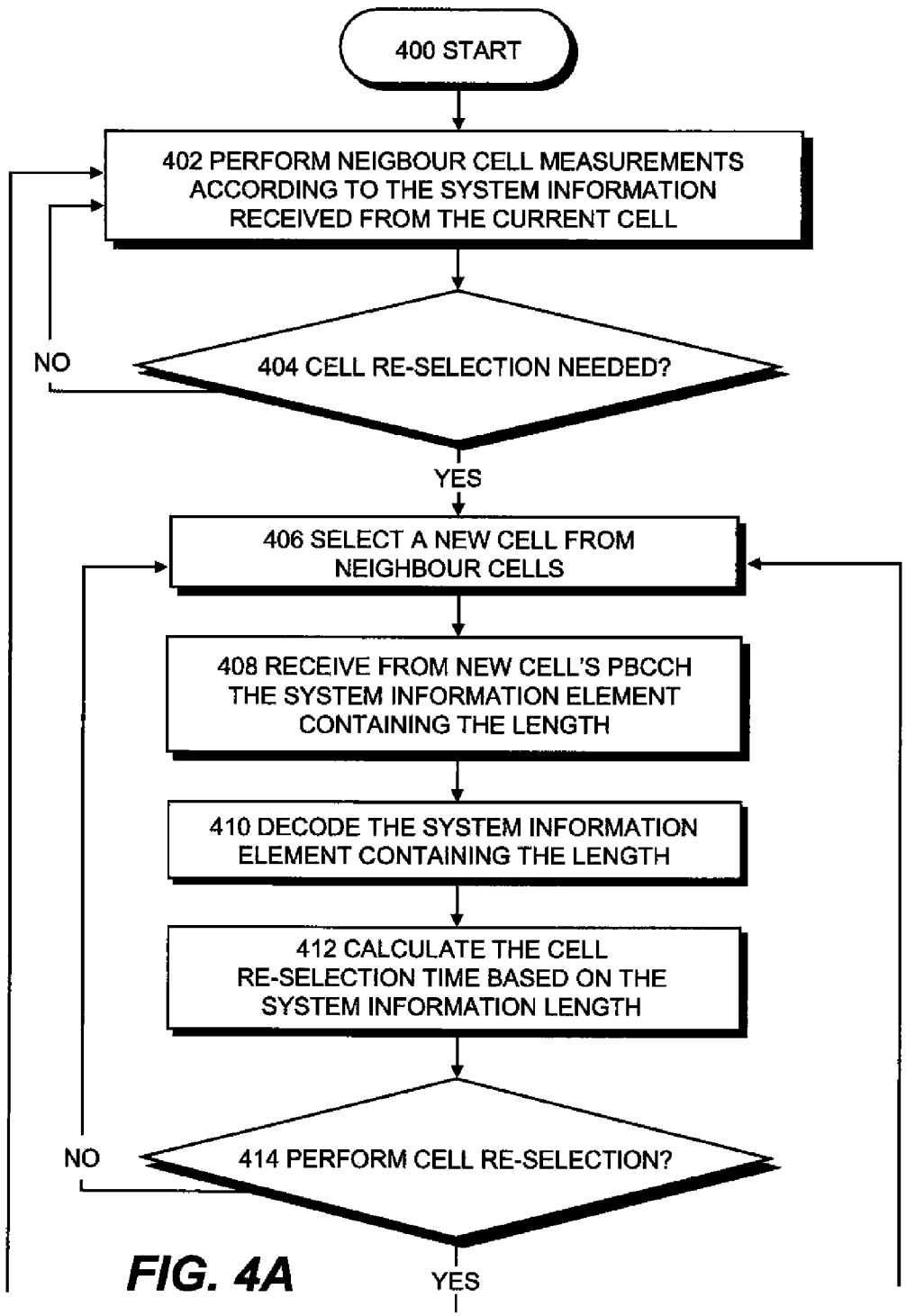
Figure 4B:
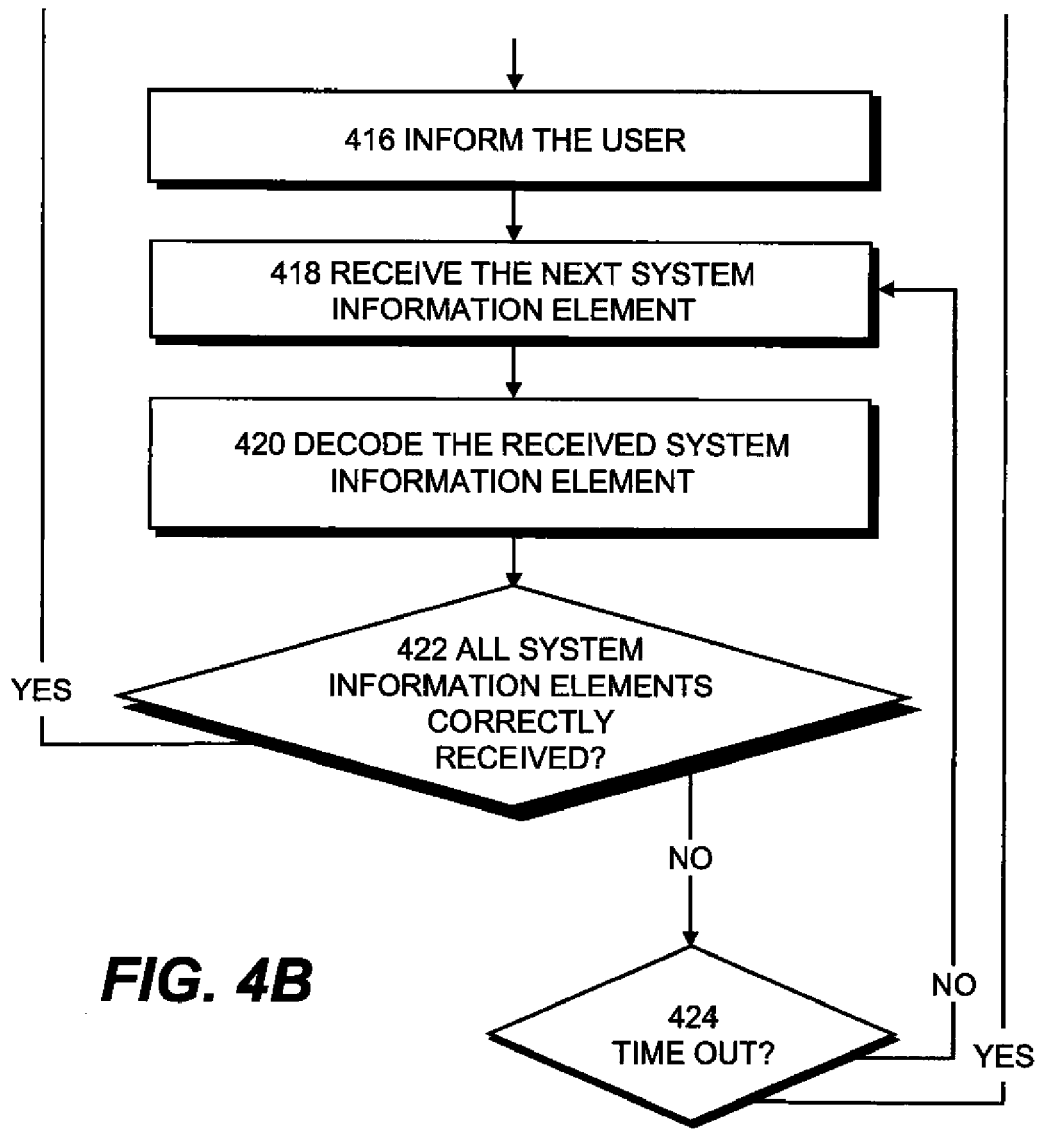

FIGS. 4A and 4B describe the method of cell re-selection in a cellular network. The Figures form a flow chart when the bottom of FIG. 4A and the top of FIG. 4B are placed next to each other.

The method starts from block 400.

In block 402 the subscriber terminal measures received powers of neighbour cells in accordance with the system information received from the current cell.

In block 404 the subscriber terminal or the network part decides whether cell re-selection is needed based on the received powers measured by the subscriber terminal. If cell re-selection is not performed the subscriber terminal continues the measurements in block 402.

If cell re-selection is performed, then one of the neighbour cells is selected as the new cell in block 406. The cell offering the best received power is, for example, selected as the new cell.

Thereafter in block 408 the subscriber terminal receives a part of the system information sent by the new cell. The system information elements are sent on the PBCCH, and one of the elements, preferably an element referred to as PSI1 contains the system information length, i.e. a figure indicating the number of system information elements.

In block 410 the subscriber terminal decodes the received PSI1 element.

In block 412 the time it takes to receive the system information of the new cell is calculated using the length information in the system information part sent by the new cell. In order to perform the calculation, information is also needed on the organization of the system information, for example information on the multiframe length, the number of radio blocks used for transmitting system information in one multiframe and on the repeat period of the system information part. These parameters will be explained in more detail below.

Optionally it is decided in block 414 on the basis of the calculated time whether re-selection of said cell is continued.

If re-selection is not desired, then the process proceeds to block 406 to select another neighbour cell 'as the new cell.

When it is desired to continue cell re-selection the process proceeds to an optional block 416 where the user is provided with information about cell re-selection. An example of the information provided is that packet transmission is interrupted for a calculated time. This has the advantage that the user believes that the service obtained is of higher quality. The application performing packet transmission can also be informed about cell re-selection.

Next in block 418 the following system information element is received, and in block 420 the received element is decoded.

In block 422 it is checked if all system information elements needed are received. If so, then cell re-selection is successfully performed, and the process can return to block 402, and. start measuring received powers of neighbour cells in accordance with the system information received from the new cell.

If all elements are not yet received, then the time it has actually taken to receive the system information of the new cell can optionally be compared in block 424 with the time calculated in block 412. Re-selection of said new cell is interrupted if the actual time exceeds the calculated time. A safety margin, for example 20%, can also be determined to the calculated time, in which case the interruption is not performed until the actual calculated time is exceeded in reality by 20 percent. When interruption occurs the process returns to block 406 where another neighbour cell is selected as the new cell. If no interruption occurs, then the process continues from block 418, where the following information element is received.

In the following an example will illustrate what the system information element referred to as PSI1 (Packet System Information Type One) may be as described by CSN.1:

```
< PSI1 message content >
    < PSI1 message type : bit (6) >
    { L | H < Global TFI >: Global TFI IE) > }
    < Common parameters : Common parameters struct >
    < PRACH Control Parameters : PRACH Control Parameters IE >
    < Control Channel Description : Control Channel. Description
    struct >
    < Global Power Control Parameters : Global Power Control
    Parameters IE >
    < spare padding > ;
< Common parameters struct > ::=
    < BCCH_CHANGE_MARK : bit (3) >
    < PBCCH_CHANGE_MARK : bit (3) >
    < PSI_COUNT : bit (6) >
    < BA_GIND : bit (1) >
    < NETWORK_CONTROL_ORDER1 : bit (1) >
    < BS_CV_MAX : bit (4) >
    < CONTROL_ACK_TYPE : bit (1) ;
    { 0 | 1 < PAN_DEC :.bit (3) >
    < PAN_INC : bit (3) >
    < PAN_MAX : bit (3) > } ;
< Control Channel Description struct > ::=
    < BS_PBCCH_BLKS : bit (2) >
    { 0 | 1 < BS_PCC_CHANS : bit (4) > }
    { 0 | 1 < BS_PAG_BLKS_RES : bit (4) > }
    { 0 | 1 < BS_PRACH_BLKS : bit (4) > }
    < DRX_TIMER_MAX : bit (3) >
    < EXT_DYN_ALLOCATION_SUPPORTED : bit (1) >
    < FIXED_ALLOCATION_SUPPORTED : bit (1) >
    < CONTROL_CH_REL : bit (1) >
```

A six bit parameter referred to as PSI_COUNT (Packet System Information Count) is a parameter according to the invention indicating how many different system information elements the subscriber terminal has to receive from said cell in order to obtain all the necessary system information.

Next another example of a possible PSI1 structure is described by CSN.1:

```
< PSI1 message content > ::=
    < PAGE_MODE : bit (2) >
    < PBCCH_CHANGE_MARK : bit (3) >
    < PSI_CHANGE_FIELD : bit (4) >
    < PSI1_REPEAT_PERIOD : bit (4) >
    < PSI_COUNT_LR : bit (6) >
    { 0 | 1 < PSI_COUNT_HR : bit (4) > }
    < MEASUREMENT_ORDER : bit (1) >
    < GPRS Cell Options : GPRS Cell Options IE >
    < PRACH Control Parameters : PRACH Control Parameters IE >
    < PCCCH Organization Parameters :    PCCCH Organization
                                         Parameters IE >
    < Global Power Control Parameters :  Global Power Control
                                         Parameters IE >
    < PSI_STATUS_IND : bit >
    < padding bits >
    !< Distribution part error : bit (*) = < no string > >;
```

In this example the parameter PSI_COUNT consists of two parameters, a PSI_COUNT_LR (LR=Low Rate) and an optional PSI_COUNT_HR (HR=High Rate). These two parameters are added together in order to obtain the PSI_COUNT.

FIG. 5A depicts two different mapping schemes. Different parameters are selected for each scheme so that the parameter effect can be illustrated at the cell re-selection time.

In the description below a 51-multiframe is used as an example, but the principles hold true also for other types of multiframes, for example for a 52-multiframe. The 51-multiframe is shown in the horizontal direction, frame number zero of the 51-multiframe is shown on the left, and frame number fifty of the 51-multiframe on the right. X illustrates frames in which information elements cannot be placed, since they are allocated for other purposes, like transferring timing information or frequency correction information. X indicates one frame, and XX two frames. Radio blocks B0, B1, B2, B3, B4, B5, B6, B7, B8 and B9 are each four TDMA frames in length owing to interleaving that is performed among four TDMA frames. Information elements can be placed in radio blocks B0-B9.

M refers to the value that is used for calculating TC. TC is used for locating a PSI1 message. In the Figure TC is described vertically as an increasing figure. A first 51-multiframe is at first sent using TC value zero, then a second 51-multiframe is sent using TC value one etc. M can also be referred to as a repeat period value, since it describes at what 51-multiframe intervals the PSI1 message repeats itself. The calculation formula is:

$$TC=(FN \text{ DIV } MFL) \bmod M, \quad (1)$$

where DIV is integer number division,
mod is modulo,
FN is multiframe number (0-2715647)
MFL is multiframe length (51 or 52),
M varies between 1-16, assuming that it cannot be 1, if BS is 1 or 2.

In FIG. 5A BS refers to a number by which the network part informs the subscriber terminal into how many radio blocks system information is mapped in one 51-multiframe.

In the example above the service provider has selected value four as mapping parameter M and value one as mapping parameter BS. PSI_COUNT obtains the value six. Slightly more than six 51-multiframes are used for receiving the described information elements PSI1, PSI2(0), PSI2(1), PSI2 (3), PSI1 repeat, PSI3 and PSI4. The cell selection time can be calculated as 1441.4 milliseconds.

In the example below the service provider has selected value five as mapping parameter M and value four as mapping parameter BS. PSI_COUNT obtains the value twenty-one, The PSI1 message is thus not repeated as frequently as in the above example. A fourfold amount of the transfer capacity of one 51-multiframe is used compared with the example above. Therefore slightly less than six 51-multiframes are used for receiving the described information elements PSI1, PSI2(0), PSI2(1), PSI1 repeat, PSI2(2), PSI2(3), PSI2(4), PSI2(5), PSI2(6), PSI2(7), PSI3, PSI3B(0), PSI3B(1), PSI3B(2), PSI3B(3), PSI3B(4), PSI3B(5), PSI3B(6), PSI3B(7), PSI4 (0), PSI4(1), PSI4(2), PSI1 repeat, PSI4(3), PSI4(4), and PSI1 repeat. The cell selection time can be calculated as 1316.7 milliseconds. The letter B in the information elements refers to bis.

Even though the subscriber terminal has to receive much more system information in the example below than in the example above, the re selection time is shorter in the example below. This is caused by the selected mapping parameter values.

In the following an example is presented of the rules the subscriber terminal should use in order to know how the network part sends the packet system information. The messages are sent in determined multiframe radio blocks. The message occurrences are determined using the previously presented formula 1. The basic rules are:

1. PSI1 is sent in B0 using TC value zero.
2. If BS>1, then PSI1 appears only twice in the multiframe using TC value 0. The second PSI1 occurrence using TC value 0 is in the last available radio block of the multiframe.

In addition to the basic rules various rules can be determined on how the rest of the packet system information is mapped, for example:

3. The rest of the packet system information is mapped to the available radio blocks using the rule: All existing instances of PSIx and PSIxbis (where x=2, 3, 4, 5) are placed into the radio blocks which are to be used in ascending order.
4. The rest of the unfilled available radio blocks are filled in accordance with rule 3 starting from PSI1.

Figure 5B:
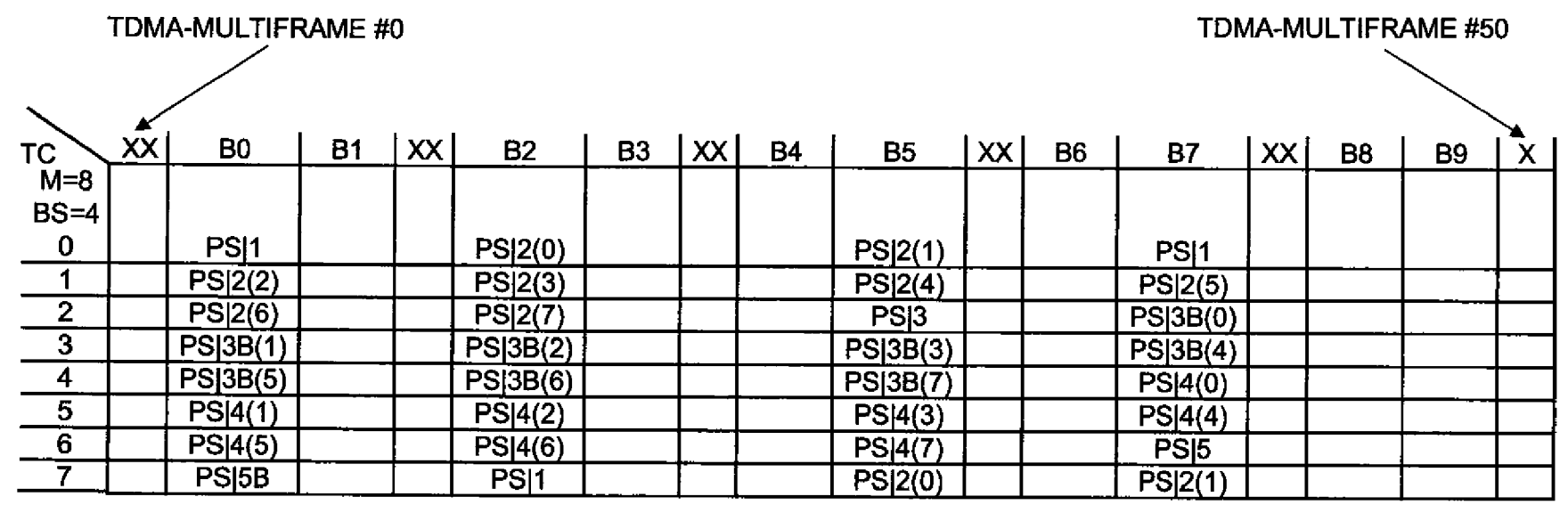

FIG. 5B shows an example of how values M eight, BS four, and PSI_COUNT twenty-eight can be used to place the system information elements into a 51-multiframe using the four rules above. The available radio blocks are B0, B2, B5 and B7. According to rule 1, PSI1 is placed in B0 using TC value zero. According to rule 2, PSI1 repeat is placed into the last available radio block, or B7, using TC value zero. The rest of the information elements are placed in accordance with rule 3 in ascending order starting from TC value zero from B2 and ending at TC value 7 in B0. In accordance with rule 4 system information elements starting from PSI1, i.e. elements PSI1, PSI2(0) and PSI2(1) are placed in ascending order into the rest of the radio blocks, or B2, B5 and B7.

An example is shown below of an algorithm by which the network part or the subscriber terminal can calculate the cell re-selection time in ideal circumstances. Ideal means that all system information elements are correctly received the first time, and that no mistakes occur during reception. The algorithm is written with a notation understood by Matlab™ program:

Input parameter from the network system information elements used for calculating the ideal cell reselection time:
MFL=MultiFrame Length
BS=BS_PBCCH_BLKS;
N=PSI_COUNT
M=PSI1_REPEAT_PERIOD Assumption:
PSI1_REPEAT_PERIOD cannot equal 1 if BS_PBCCH_BLKS equal 1 or 2.

---

```
1. if( BS==1 | BS ==2)
2.       I = BS*(M - 1);
3. end
4. if( BS == 3 )
5.       I=BS*(M-1) + 1;
6. end
7. if(BS == 4 )
8.       I = BS*(M - 1) + 2;
9. end
10. if(BS > 1)
11.      N1 = N + 1;
12. else
13.      N1 = N;
14. end
15. M1 = 0;
.16. Q = 1;
17. s=0;
18. while( Q == 1 )
19. -  if(N1 >BS)
20.      M1 = M1 + 1;
21.      N 1 = N 1 - BS;
22.      if( BS ==3 | BS==4).
23.          if(rem(M1,M) == 0 )
24.              N1 = N1 + 2;
25.              s = s + 1;
26.          end
27.      end
28.  else
29.      Q = 0;
30.      if(M1 == 0 & BS > 1)
31.          N1 = N1 - 1;
32.      end
33.  end
34. end
35. if( s>0)
36.      if(BS == 3 BS == 4 )
37.          if( rem(M1,M) == 0 )
38.              N1 = N1 - 1;
39.          end
40.      end
41.      M1 = M1 -s;
42. end
43. if( N>(I+1))
44.      if(BS > 1 )
45.          R = N - ( M*BS );
46.      else
47.          R = N - M - 1;
48.          if( R<0)
49.              R = 0;
50.          end
51.      end
52.      m = fix(R / I) + 1;
53.      M1 = .M1 + m;
54. end
55. if( N 1 == 1 )
56.      if( MFL == 51 )
57.          x = 6;
58.      else
59.          x = 4;
60.      end
61. end
62. if( BS == 2 )
63.      if(N 1 == 2 )
64.          x = 30;
65.      end
66. end
67. if( BS == 3 | BS == 4
68:      if( N 1 == 2 )
69.          if( MFL == 51 )
70.              x 16;
71.          else
72.              x = 17;
73.          end
74.      else
75.          if( N1 == 3 )
76.              x = 30;
77.          end
78.      end
79. end
80. if( N 1 == 4 )
81.      if(MFL ==51 )
82.          x = 40;
83.      else
84.          x = 43;
85.      end
86. end
87. T1 = MFL_TIME * M1;
88. T2 = TDMA_TIME * x;
89. T = T1 + T2;
```

Fixed parameter:
TDMA_TIME 1 burst time;
Variable:
MFL_TIME=MFL*TDMA_TIME;
Variable explanation:
M: Parameter available from the network system information.
Used to calculate the TC-value.
Note: This value is the same as the mentioned PSI1_REPEAT_PERIOD.
PSI_COUNT: Parameter available from the network system information.
And:
rem(x,y)
equals modulus division (MOD), and:
fix(x,y)
equals integer division (DIV), and
T
equals the actual ideal cell re-selection time.

FIGS. 6A, 6B, 6C, 6D, 6E illustrate the cell re-selection times using different mapping parameters calculated by the above algorithm. The PSI_COUNT value is described on the X-axis and the cell re-selection time in milliseconds on the y-axis. In all Figures the PSI_COUNT obtains values between 1-28 and MFL is 51.

Figure 6A:
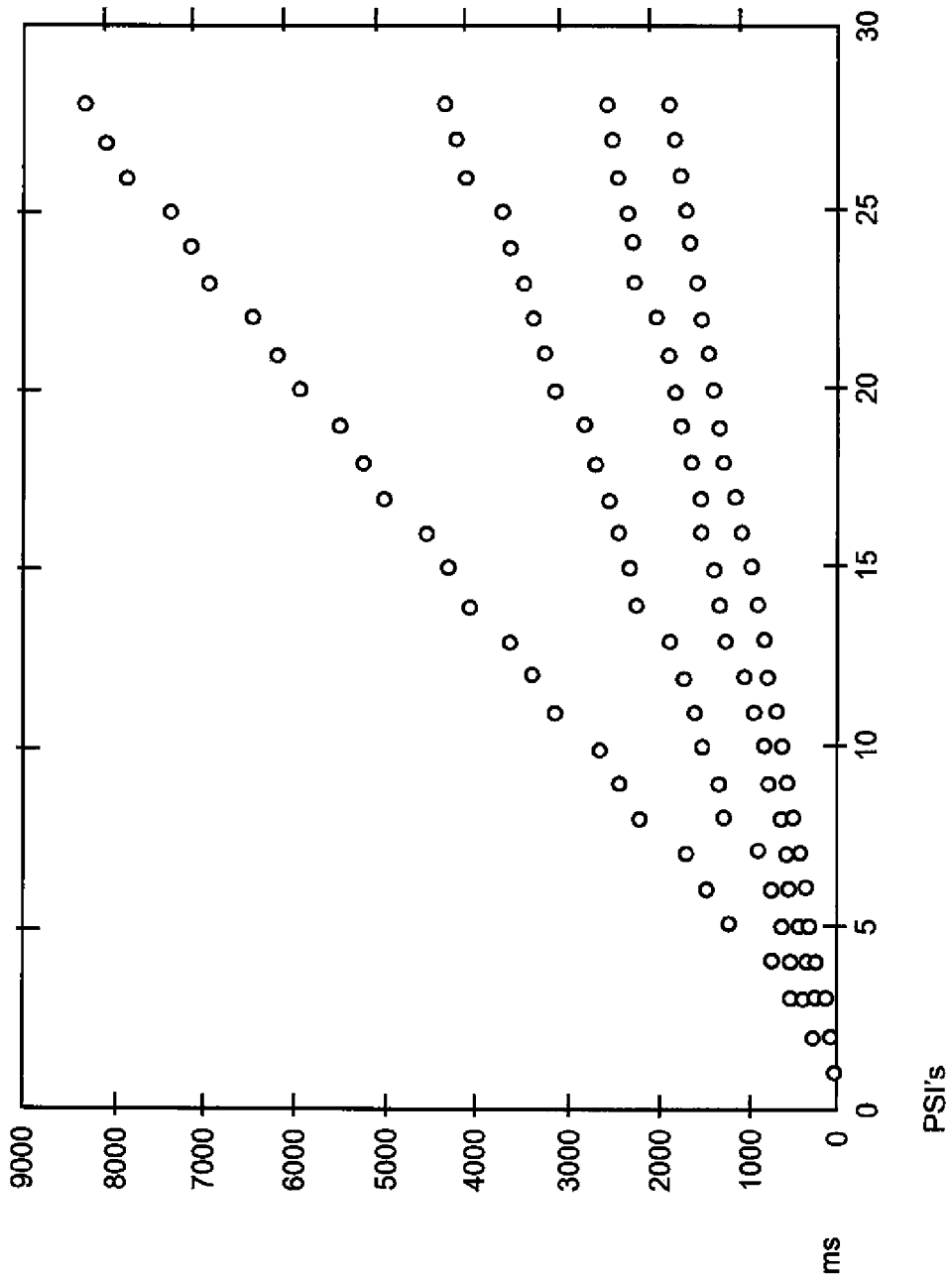
FIGS. 6A, 6B, 6C, 6D and 6E depict calculated cell re-selection times using different mapping parameters.
Figure 6C:
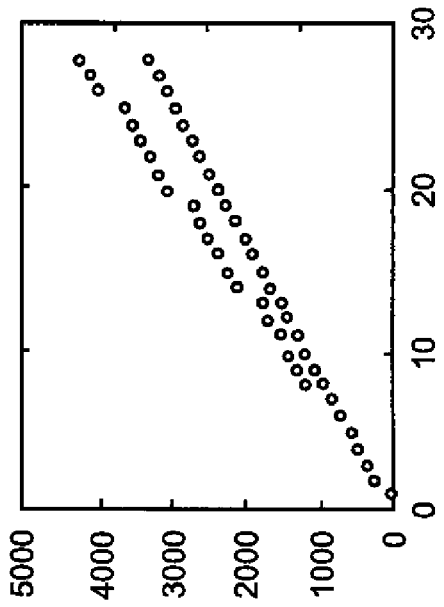
Figure 6E:
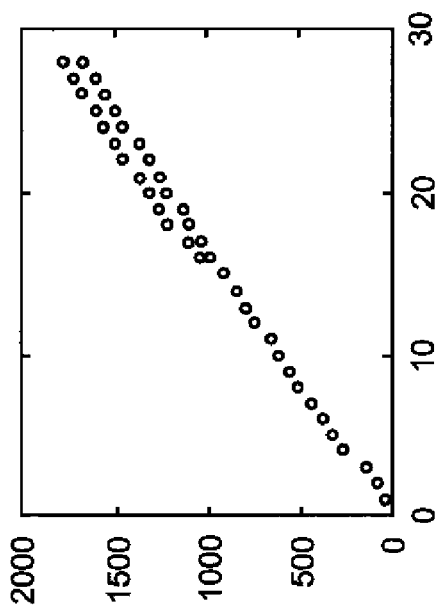

In FIG. 6A M is 4. Basically, four values are calculated for each PSI_COUNT value, the BS obtaining the values 1, 2, 3 and 4. The dots form four curves, the lowest one corresponding to BS value 4, the second lowest to BS value 3, the third lowest to BS value 2 and the highest to BS value 1. The more frequently information elements are sent, the faster the cell re-selection can be performed.

Figure 6B:
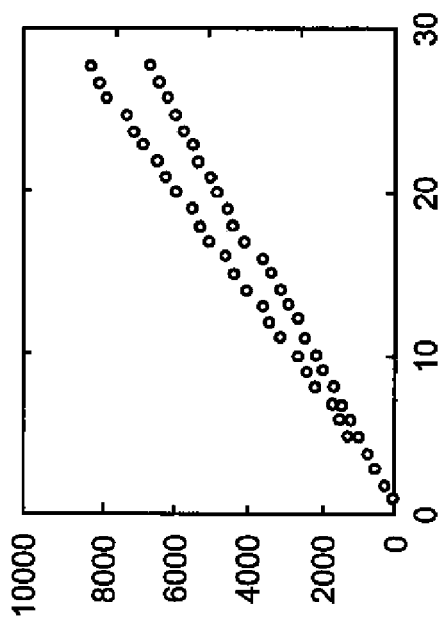
Figure 6D:
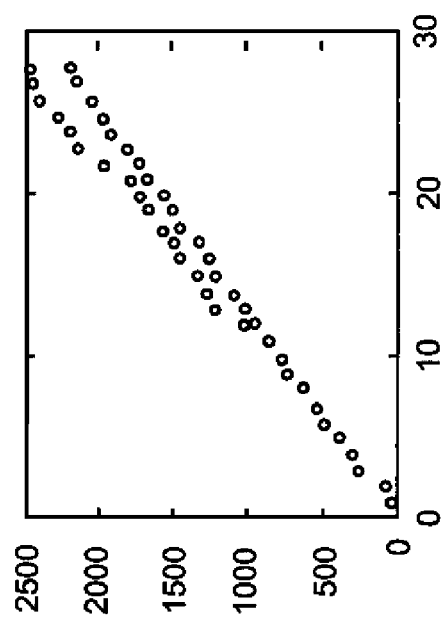

FIGS. 6B, 6C, 6D and 6E describe the effect of changing the M value. The lower curve of dots corresponds to M value 16 and the higher curve to M value 4. In FIG. 6B, BS obtains the value 1, in FIG. 6C the value 2, in FIG. 6D the value 3 and FIG. 6D the value 4. The more radio blocks each multiframe uses, the less the M value affects the cell re-selection time.

The example above was based on the presented basic rules. It is obvious that one skilled in the art may apply other rules too, in order to implement the invention. In the following an example of different rules is presented:

1. PSI shall be sent in block B0 when TC=0.
2. If the value of the parameter BS_PBCCH_BLKS is greater than 1, the PSI1 shall also be sent in block B6 (for 52-multiframe) or B5 (for 51-multiframe) when TC=0.
3. The PSI messages in the group sent with a high repetition rate shall be sent in a sequence determined by the network and starting at TC=0, using the PBCCH blocks within each multiframe which are not occupied according to rule 1 or 2. The sequence of these PSI messages shall be repeated starting at each occurrence of TC=0.

4. The PSI messages in the group sent with a low repetition rate shall be sent in a sequence determined by the network and continuously repeated, using the PBCCH blocks within each multiframe which are not occupied according to rules 1 to 3.

If there are multiple instances of a particular PSI message type, they shall all be sent within the same PSI message group according to either rule 3 or 4 above. They shall be sent in a single sequence in the ascending order of the message instance number of that PSI message type.

The same PSI message shall not occur twice within the lists defined by the PSI_COUNT_LR and PSI_COUNT_HR.

A full set of Packet System Information messages contains one consistent set of the messages included in PSI_COUNT_LR and one consistent set of messages included in PSI_COUNT_HR plus the PSI1 message.

The invention is preferably implemented by software. The invention then requires relatively simple software changes within a strictly restricted area in the network part and the subscriber terminal. The subscriber terminal comprises means for measuring received powers of neighbour cells in accordance with the system information received from the current cell, means for discovering the need for cell re-selection, means for receiving system information sent by the new cell, and means for calculating the time it takes to receive the system information of the new cell based on the length information in the system information part sent by the new cell. The network part comprises means for sending cell system information, and means for placing the length information indicating the system information length into a part of the system information. The matter disclosed in the dependent method claims can correspondingly be implemented by the means performing the operation. The means are preferably implemented as software, for example, as a software to be carried out in a processor or as an ASIC (Application Specific Integrated Circuit). In the subscriber terminal the means are implemented by a processor including software 232, for example. In the network part the means can be divided differently depending on the responsibilities between the control unit 118 of the base station 100, the control unit of the base station controller 102 and possibly also the support node 140.

The invention has been described in detail with particular reference to certain preferred embodiments thereof, but it will be understood that variations and modifications can be effected within the spirit and scope of the invention.

The invention claimed is:

1. A network part of a cellular network comprising:
   means for sending system information of a new reselected cell from a base station of the new reselected cell to a subscriber terminal, a base station of a current cell having previously sent neighbor cell information to the subscriber terminal that identifies the new reselected cell;
   means for placing information indicating a system information length into a part of the system information; and
   means for calculating the time it takes for the subscriber terminal to receive the system information using the length information.

2. The network part as claimed in claim 1, wherein the system information enables the subscriber terminal to initiate cell communication with the new reselected cell.

3. The network part as claimed in claim 2, wherein the information indicating a system information length is for calculating a re-selection time between the subscriber terminal and the new reselected cell.

4. The network part as claimed in claim 3, wherein the subscriber terminal determines whether to continue or discontinue cell reselection based on the calculated reselection time.

5. The network part as claimed in claim 4, wherein the cell communication is a bi-directional cell communication.

* * * * *